C. L. FLOYD.
LUBRICANT CUP.
APPLICATION FILED NOV. 28, 1919.
1,403,239.
Patented Jan. 10, 1922.
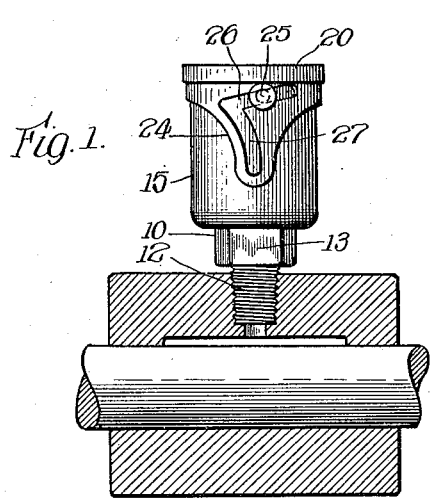
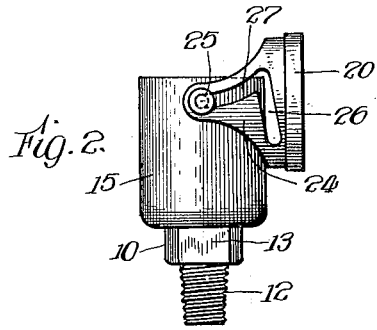
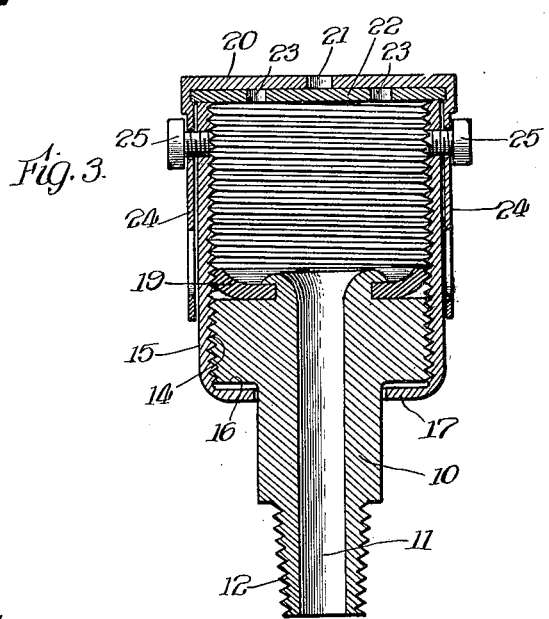
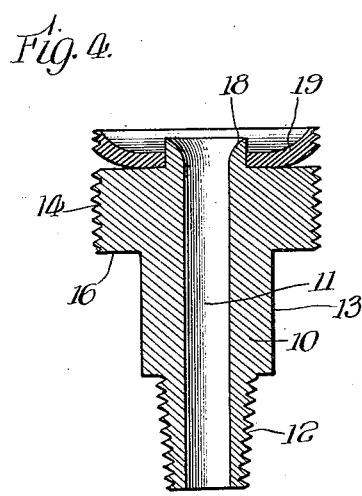
Inventor:
Charles L. Floyd
By Walter M. Fuller
Atty.
Witness:
Alvr B. Roessner

UNITED STATES PATENT OFFICE.

CHARLES L. FLOYD, OF RIVERSIDE, ILLINOIS, ASSIGNOR TO GEORGE G. FLOYD, OF RIVERSIDE, ILLINOIS.

LUBRICANT CUP.

1,403,239.

Specification of Letters Patent.   Patented Jan. 10, 1922.

Application filed November 28, 1919. Serial No. 340,970.

*To all whom it may concern:*

Be it known that I, CHARLES L. FLOYD, a citizen of the United States, residing at Riverside, in the county of Cook and State of Illinois, have invented certain new and useful Improvements in Lubricant Cups, of which the following is a specification.

My invention pertains to novel structural features and operating advantages in appliances for feeding grease, oil, and the like, to bearings of various kinds, the leading object of the invention being the production of a lubrication cup or receptacle adapted to overcome the several defects of the grease and oil cups now used in large quantities on automobiles, trucks, farm-implements, shaft-bearings, etc. To this end it is one of the prime aims of the invention to supply an appliance of this type embodying few parts of simple structure economical to produce, in which the screw-threaded cap or cup is permanently secured to the main body of the device hence eliminating any possibility of such part being jarred loose and lost as not infrequently occurs in the present style of grease-cups, in which the co-acting threads of the two parts of the device cannot be crossed because such elements are not required to be separated to fill the cup, in which the effect of suction is successfully overcome when the cap is unscrewed or backed away for refilling, and hence the grease or other lubricant is not drawn out of the channel or passage to the bearing in which it had previously been forced, and in which the parts of the appliance are so formed and fitted together and correlated that none of the lubricant is lost in the manipulation of the device.

To permit those skilled in this art to have a full and complete understanding of this invention I have illustrated in the accompanying drawings forming a part of this specification a preferred and desirable embodiment of the invention, like reference characters being used for the same parts throughout the various views.

In this drawing:

Figure 1 is a side elevation of the lubrication-cup applied to a bearings;

Figure 2 shows the cover for the cup open;

Figure 3 is an enlarged vertical central section through the cup; and

Figure 4 illustrates the manner of threading the leather gasket and securing it in position.

Referring to the drawings, it will be seen that the improved device includes a main-body 10 having a central passage or bore 11 therethrough by means of which the lubricant is fed or forced to the bearing with which it is associated. Such element 10 is threaded at 12 at a reduced diameter portion permitting it to be screwed into a threaded hole in the member with which it co-operates, and it is flattened at 13 for the application of a wrench to facilitate its turning. At 14 such hollow or apertured element is externally screw-threaded on a portion of larger diameter for association with an internally-threaded adjustable cap or cup 15, and to provide that the latter member may not be wholly unscrewed or removed from its supporting element 10, the latter is supplied with a shoulder 16 adapted to form a stop or abutment for the lower inturned marginal flange or lip 17 of the adjustable cap, thus limiting the degree or extent of its unscrewing.

In order to make the threaded joint between such main-body 10 and the cap or cup 15 absolutely proof against leakage of the lubricant even though the latter is under considerable pressure, in the manufacture of the former structural element, an upstanding circular flange or rib 18 is left on its upper face surrounding its central passage. A leather or other suitable centrally-perforated disc-washer or gasket 19 is fitted over such rib and then the latter is turned or spun down over the disc, holding it firmly and securely in position. This somewhat-flexible gasket is slightly greater in diameter than the threaded larger portion of the body 10, and while in cupped or concave form as shown in Figure 4, the edge of such disc has a screw thread cut therein corresponding to the adjacent thread of element 10. It will be clear, therefore, that, as the cup or cap with the grease or other lubricant therein is screwed down over the disc and the body 10, the pressure of the lubricant will flatten out the disc, thereby tending to enlarge its effective diameter, and it will constitute a gasket, completely and effectively sealing the joint between the two threaded metal parts and preventing escape of the lubricant at this point. The greater the pressure imposed on the lubricant, as by screwing down the cap, the more tightly will the joint be sealed.

The upper open end of such cap or cup is adapted to be closed by a round cover 20 having a combined hinge and rotary mounting, the cover having a central aperture or valve-port 21 therethrough normally closed by a flat leather disc or washer 22 held inside the cover by its circular edge fitting in a groove or seat in the cover and provided with one or more holes 23 therethrough out of register or in non-alignment with the cover port. When the cap is screwed down such valve-disc will be held firmly against the flat inner face of the cover, whereby all of the holes are effectively closed. When, however, the cap is unscrewed or backed away as for refilling, owing to the likelihood of a vacuum forming in it with a resulting tendency to suck or draw the grease or other lubricant out of the channel 11, the valve-disc will bow inwardly slightly, thereby opening the non-registering holes and relieving such suction before any detrimental withdrawal action on the grease occurs.

Such cover is permanently secured to the cap by a pair of opposite angularly-slotted ears or extensions 24, 24 the slots of which receive the shanks of a pair of outstanding headed pins or screws 25, 25. These ears are desirably curved to fit the exterior cylindrical surface of the cap and the slot of each has a portion 26 slightly inclined or sloping with respect to the round top of the cover so that by turning the cover about its own axis it may, by the co-action between the pins and the sloping edges of these portions of the slots, be tightened against the upper edge of the cap which bears on the disc 22, whereby the latter forms a packing or gasket between these two parts, avoiding leakage or escape of the lubricant at this point.

Each slot has another portion 27 which, after the cover has been turned to bring the apexes of the combined slots into register with the pins, permits the cover to be raised and swung out of the way exposing the upper mouth or open end of the cap wholly unobstructed. Such a temporary opening of the cap permits it to be refilled with the proper lubricant, whereupon the cover is swung back into place, pushed down into position, and turned to wedge its valve gasket against the edge of the cap.

In assembling the parts of this appliance preliminary to the screwing of the section 12 into the bearing member, the cap or cup is opened by swinging the cover over out of the way whereupon the main body 10 is introduced through such uncovered mouth and screwed down inside of the cap, after which the lubricant may be fed or delivered into the cap and its cover then replaced in position. Of course, the presence of the shoulder 16 prevents the cap from being wholly unscrewed from the main-body.

In refilling the cap or cup, it may be unscrewed or backed away sufficiently to obtain a substantial holding frictional engagement between the lip or flange 17 and the shoulder or abutment 16, then the cover may be released and swung out of the way, the cup thereupon being replenished with the lubricant. Then the cover may be returned into position and turned to secure the wedge action specified, which manipulation of the cover is in the same direction as would tend to overcome the frictional engagement of the parts 16 and 17. The pitch of the thread between the cup and the main-body is such that an adequate wedging of the cover on the cup may be had whereupon turning of the cup in the same direction releases the friction hold.

Whereas the particular embodiment of the invention illustrated and described in detail is more especially adapted for employment as a compression grease-cup, it is to be borne in mind, nevertheless, that several features of the structure may be used to advantage in lubricating appliances using oil or some lubricant other than grease.

The invention is not limited or restricted to the precise and exact details of construction specified since these are subject to modification within considerable limits without departure from the heart and substance of the invention as defined by the appended claims.

I claim:

1. In a lubrication-cup of the character described, the combination of a hollow body adapted to contain the lubricant, a cover for said body, and a combined hinge and wedge connection between said cover and body allowing the cover to be swung on its hinge mounting to open position to permit refilling of the body and permitting the cover to be firmly wedged closed on said body when the cover is fitted over and turned about the axis of said body, substantially as described.

2. In a lubrication-cup of the character described, the combination of a hollow body adapted to contain the lubricant, a cover for said body, and a pin and slot connection between said cover and body shaped to allow the cover to be swung to open position to permit refilling of the body and permitting the cover to be firmly wedged closed on said body when the cover is fitted over and turned about the axis of said body, substantially as described.

3. In a lubrication-cup of the character described, the combination of an apertured main-body through which the lubricant is adapted to pass, a cap threaded on said main-body and designed to force the lubricant through said aperture, a cover for said cap, and a combined hinge and wedge connection between said cover and the cap allowing the cover to be swung on its hinged mounting to open position to permit refilling of the cap and permitting the cover to be firmly wedged closed on said cap when the cover is fitted over and turned about the axis of said cap, substantially as described.

4. In a lubrication-cup of the character described, the combination of an apertured main-body through which the lubricant is adapted to pass, a cap threaded on said main-body and designed to force the lubricant through said aperture, a cover for said cap, and a pin and slot connection between said cover and cap shaped to allow the cover to be swung to open position to permit refilling of the cap and permitting the cover to be firmly wedged closed on said cap when the cover is fitted over and turned about the axis of said cap, substantially as described.

5. In a lubrication-cup of the character described, the combination of an apertured main-body through which the lubricant is adapted to pass, a cap threaded on said main-body and designed to force the lubricant through said aperture, a cover for said cap, and a pair of opposite pin and angle-slot connections between said cover and cap shaped to permit the cover to be swung to open the cap for refilling purposes and to permit a wedging action holding the cover firmly closed on the cap when positioned over and turned about the axis of the latter, substantially as described.

6. In a lubrication-cup of the character described, the combination of a hollow body, an apertured cover therefor movable to open said body, and an apertured resilient disc in said cover acting as a valve in co-operation with the hole of the cover, said disc constituting a gasket between said cover and body in the closed position of the former, substantially as described.

7. In a lubrication-cup of the character described, the combination of a main-body having a passage therethrough traversed by the lubricant, a hollow cap threaded thereon, an apertured cover for said cap movable to open the latter, and an apertured resilient disc in said cover acting as a valve in co-operation with the cover-hole to relieve the suction which might otherwise occur when the cap is unscrewed, said disc constituting a gasket between said cover and cap in the closed position of the former, substantially as described.

8. In a lubrication-cup of the character described, the combination of a main-body having a passage for the accommodation of the lubricant, a cap having a screw-threaded engagement with said body, an apertured cover for said cap, an apertured resilient disc in said cover acting as a valve in co-operation with the hole of the cover to relieve the suction when the cap is unscrewed, and a pair of pin-and-slot connections between said cover and cap shaped to permit the cover to be swung to open the cap and to permit a wedging action to hold the cover firmly on the cap, said disc constituting a gasket between said cover and cap in the closed position of the former, substantially as described.

9. In a lubrication-cup of the character described, the combination of a body having a passage for the lubricant therethrough, a cap having a threaded engagement with said body, and a threaded gasket forced by the pressure of the lubricant into the threaded portion of said cap, substantially as described.

10. In a lubrication-cup of the character described, the combination of a body having a passage for the lubricant, a cap having threaded engagement with said body and a cup-shaped gasket secured to said body and having a threaded edge of substantially the same diameter as the threaded part of said body, whereby compression of the contained lubricant tends to flatten the gasket and seal the joint between the threaded members, substantially as described.

11. In a lubrication-cup of the character described, the combination of a body having a passage for the lubricant, a cap having threaded engagement with said body, and a cup-shaped gasket having a threaded edge of substantially the same diameter as the threaded part of said body and adapted under compression of the contained lubricant to flatten and seal the joint between the threaded members, substantially as described.

CHARLES L. FLOYD.